United States Patent [19]
Benazzi et al.

[11] Patent Number: 5,968,475
[45] Date of Patent: *Oct. 19, 1999

[54] DEALUMINATED IM-5 ZEOLITE

[75] Inventors: Eric Benazzi, Chatou; Hervé Cauffriez, Bougival, both of France

[73] Assignee: Institut Francais du Petrole, France

[*] Notice: This patent is subject to a terminal disclaimer.

[21] Appl. No.: 09/012,190

[22] Filed: Jan. 23, 1998

[30] Foreign Application Priority Data

Jan. 24, 1997 [FR] France ................................. 97 00863

[51] Int. Cl.⁶ ........................... C01B 39/06; C01B 39/46
[52] U.S. Cl. ...................... 423/713; 423/714; 423/715; 423/718; 502/85; 502/68; 502/74; 208/46; 208/120.01; 208/135
[58] Field of Search ..................... 423/713, 714, 423/715, 718; 502/66, 68, 74, 85, 86

[56] References Cited

U.S. PATENT DOCUMENTS

| | | |
|---|---|---|
| 3,832,449 | 8/1974 | Rosinski et al. ................. 423/718 |
| 4,557,919 | 12/1985 | Sumitani et al. . |
| 4,579,993 | 4/1986 | Bowes et al. . |
| 5,043,307 | 8/1991 | Bowes et al. . |
| 5,242,676 | 9/1993 | Apelian et al. ..................... 423/714 |
| 5,310,534 | 5/1994 | Fajula et al. . |
| 5,512,267 | 4/1996 | Davis et al. ........................ 423/718 |

FOREIGN PATENT DOCUMENTS

| | | |
|---|---|---|
| 095304 | 11/1983 | European Pat. Off. . |
| 172686 | 2/1986 | European Pat. Off. . |
| 190949 | 8/1986 | European Pat. Off. . |
| 488867 | 6/1992 | European Pat. Off. . |
| 93/02994 | 2/1993 | WIPO . |
| 98/17581 | 4/1998 | WIPO . |

*Primary Examiner*—Mark L. Bell
*Assistant Examiner*—David Sample
*Attorney, Agent, or Firm*—Millen, White, Zelano & Branigan, P.C.

[57] ABSTRACT

The present invention relates to a dealuminated IM-5 zeolite and to any catalyst comprising that zeolite which is at least partially in its acid form. The invention also relates to the preparation of the catalyst and to the catalyst. Finally, the invention relates to the use of the zeolite in a hydrocarbon conversion process.

19 Claims, No Drawings

DEALUMINATED IM-5 ZEOLITE

SUMMARY OF THE INVENTION

The present invention relates to a dealuminated IM-5 zeolite and to any catalyst comprising that zeolite which is at least partially in its acid form. The invention also relates to the use of the catalyst in a hydrocarbon conversion process.

The prior art is illustrated in the following patents: European patent EP-A-0 190 949, international patent application WO-A-9302994, EP-A-0 172 686, EP-A-0 095 304, EP-A-0 488 867 and United States patent U.S. Pat. No. 5,043,307.

The IM-5 zeolite in its hydrogen form of the present invention has a structure which has not yet been clarified. It has been described in French patent application 96/12873 dated Oct. 10, 1996, a partial description of which is hereby incorporated by reference.

The novel zeolitic structure, termed IM-5, has a chemical composition with the following formula, expressed in terms of the mote ratios of the oxides for the anhydrous state:

$$100XO_2, mY_2O_3, pR_{2/n}O$$

where
  m is 10 or less;
  p is 20 or less;
  R represents one or more cations with valence n;
  X represents silicon and/or germanium, preferably silicon;
  Y is selected from the group formed by the following elements: aluminium, iron, gallium, boron, and titanium, Y preferably being aluminium; and is characterized by an X ray diffraction diagram, in its as synthesized state, which comprises the peaks shown in Table 1.

The IM-5 zeolite in its hydrogen form, designated H-IM-5, is obtained by calcining step(s) and/or ion exchange step(s) as will be explained below. The H-IM-5 zeolite has an X ray diffraction diagram which comprises the results shown in Table 2.

TABLE 1

X ray diffraction table for IM-5 zeolite, as synthesised state

| $d_{hkl}$ (Å) 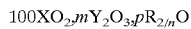 | $I/I_{max}$ |
|---|---|
| 11.8 ± 0.35 | s to vs (1) |
| 11.5 ± 0.30 | s to vs (1) |
| 11.25 ± 0.30 | s to vs (1) |
| 9.95 ± 0.20 | m to s |
| 9.50 ± 0.15 | m to s |
| 7.08 ± 0.12 | w to m |
| 6.04 ± 0.10 | vw to w |
| 5.75 ± 0.10 | w |
| 5.65 ± 0.10 | w |
| 5.50 ± 0.10 | vw |
| 5.35 ± 0.10 | vw |
| 5.03 ± 0.09 | vw |
| 4.72 ± 0.08 | w to m |
| 4.55 ± 0.07 | w |
| 4.26 ± 0.07 | vw |
| 3.92 ± 0.07 | s to vs (2) |
| 3.94 ± 0.07 | vs (2) |
| 3.85 ± 0.05 | vs (2) |
| 3.78 ± 0.04 | s to vs (2) |
| 3.67 ± 0.04 | m to s |
| 3.55 ± 0.03 | m to s |
| 3.37 ± 0.02 | w |
| 3.30 ± 0.015 | w |
| 3.099 ± 0.012 | w to m |

TABLE 1-continued

X ray diffraction table for IM-5 zeolite, as synthesised state

| $d_{hkl}$ (Å) | $I/I_{max}$ |
|---|---|
| 2.970 ± 0.007 | vw to w |
| 2.815 ± 0.005 | vw |
| 2.720 ± 0.005 | vw |

(1) Peaks forming part of a feature.
(2) Peaks forming part of the same feature.

TABLE 2

X ray diffraction table for IM-5 zeolite in its hydrogen form, H-IM-5, obtained by calcining

| $d_{hkl}$ (Å) | $I/I_{max}$ |
|---|---|
| 11.8 ± 0.30 | s to vs (1) |
| 11.45 ± 0.25 | vs (1) |
| 11.20 ± 0.20 | s to vs (1) |
| 9.90 ± 0.15 | m to s |
| 9.50 ± 0.15 | m to s |
| 7.06 ± 0.12 | w to m |
| 6.01 ± 0.10 | vw to w |
| 5.70 ± 0.10 | w |
| 5.30 ± 0.10 | vw |
| 5.03 ± 0.09 | vw |
| 4.71 ± 0.08 | w |
| 4.25 ± 0.07 | vw |
| 3.87 ± 0.07 | m to s (2) |
| 3.81 ± 0.05 | m to s (2) |
| 3.76 ± 0.04 | m to s (2) |
| 3.67 ± 0.04 | w to m |
| 3.54 ± 0.04 | m to s |
| 3.37 ± 0.03 | w |
| 3.316 ± 0.015 | w |
| 3.103 ± 0.102 | w |
| 3.080 ± 0.010 | w to m |
| 2.950 ± 0.010 | vw to w |
| 2.880 ± 0.007 | vw |
| 2.790 ± 0.005 | vw |
| 2.590 ± 0.005 | vw |

(1) Peaks form part of a feature.
(2) Peaks form part of the same feature.

These diagrams were obtained using a diffractometer and a conventional powder method utilising the $K_\alpha$ line of copper. From the position of the diffraction peaks represented by the angle $2\theta$, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
  weak (w) means less than 20;
  medium (m) means in the range 20 to 40;
  strong (s) means in the range 40 to 60;
  very strong (vs) means more than 60.

The X ray diffractograms from which the data are obtained (spacing d and relative intensities) are characterized by wide reflections with a large number of peaks forming shoulders on other peaks of higher intensity. Some or all of the shoulders may not be resolved. This may be the case for samples with low crystallinity or for samples with crystals which are small enough to produce significant broadening of the X rays. This can also be the case when the equipment or operating conditions used to produce the diagram differ from those used in the present case.

In the chemical composition defined above, m is generally in the range 0.1 to 10, preferably 0.3 to 9, and more preferably 0.5 to 8; it appears that IM-5 zeolite is generally and most readily obtained in a very pure form when m is in the range 0.8 to 8.

IM-5 zeolite is considered to have a novel basic structure or topology which is characterized by its X ray diffraction diagram. IM-5 zeolite in its "as synthesized state" has substantially the X ray diffraction characteristics shown in Table 1 and is thus distinguished from prior art zeolites. Similarly H-IM-5 zeolite, obtained by calcining and/or ion exchange steps, has substantially the characteristics shown in Table 2. The invention described in French patent application 96/12873 dated Oct. 10, 1996 also concerns any zeolite with the same structural type as that of IM-5 zeolite.

Further, some catalytic applications require an adjustment to the thermal stability and acidity of the zeolite for the envisaged reaction. One means of optimizing the acidity of a zeolite is to reduce the quantity of aluminium present in the framework. The Si/Al ratio of the framework can be regulated during synthesis or after synthesis. In the latter case, the so-called dealumination operation must be carried out with as little as possible destruction of the crystalline structure of the zeolite.

The skilled person is aware that dealumination of the framework of the zeolite leads to a solid which is thermally more stable. However, dealumination treatments undergone by zeolites lead to the formation of extra-framework aluminium species which can block the micropores of the zeolite if they are not eliminated. Controlled dealumination carried out outside the unit can precisely regulate the degree of dealumination of the zeolite framework and can also eliminate the extra-framework aluminium species which block the micropores. The post-synthesis dealumination step can be carried out using any technique which is known to the skilled person.

The present invention concerns a IM-5 zeolite comprising silicon and at least one element T selected from the group formed by aluminium, iron, gallium, and boron, preferably aluminium, characterized in that it has been dealuminated and in that it has a global Si/T atomic ratio of more than 5, preferably more than 10, more preferably more than 15, and still more preferably in the range 20 to 400.

The present invention also concerns a catalyst comprising at least one IM-5 zeolite, optionally dealuminated and at least partially, preferably practically completely, in its acid form, comprising silicon and at least one element T selected from the group formed by aluminium, iron, gallium, and boron, preferably aluminium, and at least one matrix (or binder). The global Si/T atomic ratio of the IM-5 zeolite is more than 5, preferably more than 10, more preferably more than 15, and still more preferably in the range 20 to 400.

The matrix is generally selected front the group formed by clays (for example natural clays such as kaolin or bentonite), magnesia, aluminas, silicas, titanium oxide, boron oxide, zirconia, aluminium phosphates, titanium phosphates, zirconium phosphates, silica-aluminas and coal, preferably from elements of the group formed by aluminas and clays.

When it is comprised in the catalyst of the invention, the IM-5 zeolite is at least partially, preferably practically completely in its acid form, i.e., in its hydrogen ($H^+$) form. The Na/T atomic ratio is generally less than 0.45 and preferably less than 0.30, more preferably again less than 0.15.

The global T/Al ratio of the zeolite and the chemical composition of the samples are determined by X ray fluorescence and atomic absorption.

The micropore volume can also be estimated from the quantity of nitrogen adsorbed at 77 K for a partial pressure $P/P_0$ of 0.19, for example.

The present invention also concerns the preparation of the dealuminated IM-5 zeolite and the preparation of the catalyst comprising at least one dealuminated IM-5 zeolite which is at least partially in its acid form.

To prepare the dealuminated IM-5 zeolite of the invention in the preferred case where T is Al, at least two dealumination methods can be used starting from as synthesized IM-5 zeolite comprising an organic structuring agent. They are described below. However, any other method which is known to the skilled person can also be used.

The first method, direct acid attack, comprises a first calcining step carried out in a stream of dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more optional ion exchange steps can be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

The second method, heat treatment (in particular using steam, by steaming)+acid attack, comprises firstly calcining in a stream of dry air at a temperature which is generally in the range 450° C. to 550° C., to eliminate the organic structuring agent occluded in the microporosity of the zeolite. The solid obtained then undergoes one or more ion exchanges using at least one $NH_4NO_3$ solution, to eliminate at least a portion and preferably practically all of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 550° C. to 900° C., and optionally followed by at least one acid attack using an aqueous solution of a mineral or organic acid. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment- acid attack cycles can be varied.

In the preferred case when T is Al, the framework dealumination cycle, comprising at least one heat treatment step, optionally and preferably carried out in the presence of steam, and at least one acid attack step carried out in an acid medium of the IM-5 zeolite, can be repeated as often as is necessary to obtain the dealuminated IM-5 zeolite having the desired characteristics. Similarly, following the heat treatment, optionally and preferably carried out in the presence of steam, a number of successive acid attacks can be carried out using different acid concentrations.

In a variation of this second calcining method, heat treatment of the IM-5 zeolite containing the organic structuring agent can be carried out at a temperature which is generally in the range 550° C. to 850° C., optionally and preferably in the presence of steam. In this case, the steps of calcining the organic structuring agent and dealumination of the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally be subjected to at least one ion exchange step using at least one $NH_4NO_3$ solution, to eliminate practically all of the alkaline cations, in particular sodium, present in the cationic position in the zeolite.

The catalyst can be prepared using any method which is known to the skilled person. In general, it is obtained by mixing the matrix and zeolite then forming. The optional element in the ensemble formed by elements from groups IB and VIII of the periodic table can be introduced either before forming, or during mixing, or to the zeolite itself before mixing, or, as is preferable, after forming. Forming is generally followed by calcining, generally at a temperature which is in the range 250° C. to 600° C. The optional element of the ensemble formed by elements from groups IB and VIII of the periodic table can be introduced after calcining. In all cases, the element is generally deposited as required, either, as is preferable, practically completely on the zeolite, or practically completely on the matrix, or partly on the zeolite and partly on the matrix, this choice depending, as is known to the skilled person, on parameters during depositions for example the nature of the precursor selected to carry out that deposition.

The element from groups IB or VIII, preferably selected from the group formed by Ag, Ni and Pt, preferably Ni or Pt, can also be deposited on the zeolite-matrix mixture which has been formed, using any process which is known to the skilled person. Deposition is generally carried out by means of dry impregnation, ion exchange(s) or by co-precipitation. In the case of ion exchange from precursors based on silver, nickel or platinum, die following are normally used: silver salts such as chlorides or nitrates, a tetramine complex of platinum, or nickel salts such as chlorides, nitrates, acetates or formates. This cation exchange technique can also be used to deposit the metal directly on the zeolite powder, before its optional mixing with a matrix.

Optional deposition of group IB and VIII element(s) is generally followed by calcining in air or oxygen, generally between 300° C. and 600° C., preferably between 350° C. and 550° C., and for a period which is in the range 0.5 to 10 hour(s), preferably between 1 and 4 hour(s).

When the catalyst contains a plurality of metals, these latter can be introduced either in the same manner or using different techniques, before or after forming and in any order. When the technique used is ion exchange, a plurality of successive exchange steps may be necessary to introduce the required quantities of The operating conditions used are highly variable depending on the envisaged reaction, the nature of the feed, the quality of the desired products and the facilities available to the refiner or petrochemist.

Reaction temperature: 100→850° C.

Pressure: between 0.1→25 MPa, in the presence or absence of hydrogen.

The present invention also concerns any process using a catalyst in accordance with the invention for the conversion of hydrocarbons.

The following examples illustrate the present invention without in any way limiting its scope.

EXAMPLES

Example 1

Preparation of H-IM-5/1 Zeolite, in Accordance with the Invention

The starting material was a IM-5 zeolite with a global Si/Al atomic ratio of 11.1, and a sodium content which corresponded to an Na/Al atomic ratio of 0.031 by weight. This IM-5 zeolite was synthesised in accordance with French patent application 96/12873 dated Oct. 10, 1996.

Firstly, the IM-5 zeolite underwent dry calcining at 550° C. in a stream of air and nitrogen for 6 hours. The solid obtained then underwent ion exchange in a 10 N $NH_4NO_3$ solution at about 100° C. for 4 hours. The IM-5 zeolite then underwent treatment with a 4 N nitric acid solution at about 100° C. for 5 hours. The volume V of the nitric acid solution used (in ml) was ten times the weight W of dry IM-5 zeolite (V/W=10). This treatment with a 4 N nitric acid solution was carried out a second time under the same operating conditions.

Following these treatments, the zeolite obtained was termed H-IM-5/1. It was in its H form and had a global Si/Al atomic ratio of 31.5 and a Na/Al atomic ratio of less than 0.001.

Example 2

Preparation or H-IM-5/2 Zeolite, in Accordance with the Invention

The starting material was the NH4-IM-5 zeolite prepared in Example 1 of the present invention after the NH4 NO3 treatment. The NH4-IM-5 zeolite then underwent hydrothermal treatment in the presence of 100% steam at 650° C. for 4 hours. The zeolite then underwent acid attack using a 6 N nitric acid solution at about 100° C. for 4 hours to extract extra-framework aluminium species formed during hydrothermal treatment. The volume V of the nitric acid solution used (in ml) was ten times the weight W of dry IM-5 zeolite (V/W=10).

Following these treatments, the H-IM-5/2 zeolite in its H form had a global Si/Al atomic ratio of 28.2 and a Na/Al ratio of less than 0.001.

Example 3

Evaluation of Catalytic Performances for Methylcyclohexane Cracking using Solids H-IM-5/1 and H-IM-5/2 of the Invention Zeolites H-IM-5/1 and H-IM-5/2 were formed by pelletising followed by sieving to recover a fraction with a grain size in the range 40 μm to 200 μm.

The operating conditions for the catalytic tests were as follows:

1 gram of zeolite as described above was introduced into a fixed bed tube reactor. The reactor temperature was raised to 500° C. then methylcyclohexane was introduced into the reactor. The diluting gas was nitrogen and the $N_2$/methylcyclohexane molar ratio at the reactor inlet was 12. The space velocity of methylcyclohexane, i.e., the mass of methylcyclohexane used per unit mass of zeolite per unit of time, was $55h^{-1}$. The degrees of conversion obtained are shown in the table below for the solids H-IM-5/1 and H-IM-5/2.

|  | H-IM-5/1 | H-IM-5/2 |
|---|---|---|
| Methylcyclohexane conversion (wt %) | 49 | 53 |

The methylcyclohexane conversion measurements were carried out after 5 minutes of reaction.

Thus dealuminated IM-5 zeolites exhibit catalytic activity.

We claim:

1. A IM-5 zeolite comprising silicon and at least one element T which is aluminium, iron, gallium, and boron, wherein said zeolite has been dealuminated and has a global Si/T atomic ratio of more than 5.

2. A zeolite according to claim 1, in which said element T is aluminium.

3. A zeolite according to claim 1, in which the global Si/T atomic ratio is more than 10.

4. A zeolite according to claim 1, in which the global Si/T atomic ratio is more than 15.

5. A zeolite according to claim 1, in which the global Si/T atomic ratio is in the range 20 to 400.

6. A process for the preparation of a zeolite according claim 1, comprising subjecting a calcined IM-5 zeolite to an acid attack.

7. A process according to claim 6, wherein the calcined IM-5 zeolite is formed by calcining an IM-5 zeolite in a stream of dry air at about 450° C. to 500° C., and the acid attack comprises treatment with an aqueous solution of a mineral acid or organic acid.

8. A process according to claim 7, wherein the mineral acid or organic acid is $HNO_3$, HCl or $CH_3CO_2H$.

9. A process according to claim 7, wherein ion exchange eliminating alkaline cations is performed between calcining and treatment with the aqueous solution.

10. A process according to claim 6, wherein the calcined IM-5 zeolite is ion exchanged prior to the acid attack and the acid attack comprises treatment with an aqueous solution of a mineral acid or organic acid.

11. A process according to claim 6, further comprising ion exchange subsequent to direct acid attack.

12. A process for the preparation of a zeolite according claim 1, comprising subjecting a calcined IM-5 zeolite to heat treatment and acid attack.

13. A process according to claim 12, in which the heat treatment is carried out in the presence of steam.

14. A catalyst comprising at least one matrix and at least one zeolite according to claim 1, at least partially in its acid form.

15. A catalyst according to claim 14, further comprising an element from groups IB or VIII of the periodic table.

16. A catalyst according to claim 15, in which said element is selected from the group formed by Ag, Ni and Pt.

17. A catalyst according to claim 14, in which the matrix is selected from the group consisting of clays, magnesia, aluminas, silicas, titanium oxide, boron oxide, zirconia, aluminium phosphates, titanium phosphates, zirconium phosphates, silica-aluminas and coal.

18. A process for the preparation of a catalyst according to claim 14, comprising mixing the matrix and the zeolite and forming.

19. A process for the conversion of hydrocarbons, comprising subjecting a hydrocarbon to effective conversion conditions in the presence of a conversion catalyst, wherein the catalyst is one according to claim 14.

* * * * *